United States Patent

Van Rosmalen et al.

[11] Patent Number: 6,130,418
[45] Date of Patent: Oct. 10, 2000

[54] OPTICAL SCANNING UNIT HAVING A MAIN LENS AND AN AUXILIARY LENS

[75] Inventors: Gerard E. Van Rosmalen; Marcus J. H. Willems Van Dijk, both of Eindhoven, Netherlands

[73] Assignee: U.S. Philips Corporation, New York, N.Y.

[21] Appl. No.: 09/122,410

[22] Filed: Jul. 24, 1998

[30] Foreign Application Priority Data

Oct. 6, 1997 [EP] European Pat. Off. .............. 97203061

[51] Int. Cl.⁷ ....................................................... G11B 7/00
[52] U.S. Cl. .................................... 250/201.5; 369/44.32; 250/557; 250/234
[58] Field of Search .................................. 369/54, 44.32; 250/201.5, 201.4, 555, 557, 234

[56] References Cited

U.S. PATENT DOCUMENTS

| | | | |
|---|---|---|---|
| 5,302,834 | 4/1994 | Murao | 250/561 |
| 5,605,542 | 2/1997 | Kim | 369/112 |
| 5,726,436 | 3/1998 | Oka et al. | 250/201.5 |
| 5,768,027 | 6/1998 | Takahashi | 359/637 |
| 5,850,081 | 12/1998 | Yanagisawa | 250/201.5 |

FOREIGN PATENT DOCUMENTS 08212579A 8/1996 Japan .............................. G11B 7/135

OTHER PUBLICATIONS

"A 0.8 Numerical Aperture Two Element Objective Lens for the Optical Disk", Kenji Yamamoto et al, International Symposium on Optical Memory and Optical Data Storage, conference edition Jul. 8–12, 1996 (ISOM 96); OFA 2–1/345–OFA2–3/347.

*Primary Examiner*—John R Lee
*Assistant Examiner*—Glenn T Kinnear
*Attorney, Agent, or Firm*—Steven R. Biren

[57] ABSTRACT

An optical scanning device for scanning an optically readable record carrier (1) includes a radiation source (5), a radiation-sensitive detection system (7), and an optical scanning unit for focusing a scanning beam (3) produced by the radiation source to a scanning spot (9) on the record carrier. The scanning unit including a lens system having an optical axis (13), which lens system includes a first lens unit having a main lens (15) and a second lens unit having an auxiliary lens (17). The scanning device further includes a first detection unit involved in detection of the main lens with respect to the record carrier, and a second detection unit involved in detection of the auxiliary lens. The scanning unit further includes a first electrical drive unit for moving the first lens unit in dependence upon a signal supplied by the first detection unit, and a second electrical drive unit for moving the second lens unit with respect to the main lens in dependence upon a signal supplied by the second detection unit. The second drive unit includes a first part and a second part which cooperates with the first part via an air gap (51). The first part is secured to the first lens unit and the second part is secured to the second lens unit. In order to counteract spherical aberration and/or coma and/or astigmatism during scanning the second detection unit includes a position and orientation detector system for detecting the position and orientation of the auxiliary lens with respect to the record carrier during scanning.

18 Claims, 4 Drawing Sheets

OPTICAL SCANNING UNIT HAVING A MAIN LENS AND AN AUXILIARY LENS

BACKGROUND OF THE INVENTION

The invention relates to an optical scanning device for scanning an information track of an optically readable record carrier, which scanning device includes a radiation source, a radiation-sensitive detection system, and an optical scanning unit for focusing a scanning beam produced by the radiation source to a scanning spot on the record carrier and for imaging the scanning spot on the detection system, the scanning unit including a lens system having an optical axis, which lens system comprises a first lens unit having a main lens and a second lens unit having an auxiliary lens, which scanning device further includes a first detection means involved in detection of the main lens with respect to the record carrier, and a second detection means involved in detection of the auxiliary lens, the scanning unit further including a first electrical drive unit for moving the first lens unit in dependence upon a signal supplied by the first detection means, and a second electrical drive unit for moving the second lens unit with respect to the main lens in dependence upon a signal supplied by the second detection means, the second drive unit comprising a first part and a second part which cooperates with the first part via an air gap, the first part being secured to the first lens unit and the second part being secured to the second lens unit.

Such a scanning device is known from the International Symposium on optical memory and optical data storage, conference edition Jul. 8–12, 1996 (ISOM 96); OFA 2-1/345–OFA 2-3/347; A. 0.8 Numerical Aperture Two Element Objective Lens for the Optical Disk; Kenji Yamamoto et al. The known device is intended for scanning a magneto-optical disc and includes a first holder with an objective lens and a transparent plate and a second holder with a solid immersion lens (SIL). The magneto-optical disc has been provided with an information layer and a transparent layer, the information layer being read via the transparent layer. For the focusing and tracking purposes a focus actuator and a tracking actuator have been provided, which actuators each include a moving-coil drive for driving the first holder. A SIL actuator has been provided for moving the second holder with the solid immersion lens in a focus direction in dependence upon a variation in capacitance of a capacitor formed between the two holders. The object of this is to preclude spherical aberration owing to deviations in thickness of the transparent layer. In this respect reference is also made to JP-A 08212579A. Apart from thickness variations an optical disc exhibits curvature, for example flexure owing to the fact that the disc is supported only centrally during scanning. As a result of this, the optical disc occupies a certain oblique position with respect to the scanning beam, which gives rise to coma and astigmatism during scanning. Such optical aberrations are not precluded by the known measures.

SUMMARY OF THE INVENTION

It is an object of the invention to provide a scanning device of the type defined above, by means of which it is possible to counteract the occurrence of spherical and/or comatic and/or astigmatic aberration during scanning to be counteracted.

To this end, the scanning device in accordance with the invention is characterized in that the second detection means includes a position and orientation detector system for detecting a position and orientation of the auxiliary lens with respect to the record carrier during scanning.

During use of the scanning device in accordance with the invention, owing to the measures taken, it is possible not only to move the auxiliary lens in a direction along the optical axis of the lens system but also to tilt it about an axis transverse to the optical axis. Thus, when the optical record carrier, hereinafter also referred to as disc, is scanned at its side which faces the lens system an accurate tracking can be achieved in spite of the existence of thickness variations and an oblique position of the record carrier, thereby enabling spherical aberration, coma and astigmatism to be minimized. This is of particular importance when radiation of short wavelength is used and/or when a lens system having a comparatively large numerical aperture is employed. The use of such a lens system is important in order to increase the information density in the optical disc. This is because an increase of the numerical aperture results in a reduction of the scanning spot. Maximal results as regards the reduction of aberrations are achieved if detection of the auxiliary lens is effected with respect to a disc-shaped outer record-carrier surface which faces the lens system.

It is to be noted that from EP-A 0 727 777 a scanning device is known which utilizes a pick-up unit having an objective lens and a semispherical lens mounted in a sliding member, the sliding member being supported by a blade spring. During scanning of an optical disc the sliding member is in sliding contact with the optical-disc surface which faces the objective lens. A drawback of this known scanning device is that any kind of soiling of the afore-mentioned surface of the optical disc can impair the correct operation of the sliding member. Therefore, measures are necessary to prevent dust particles, grease and the like from settling on the relevant surface. Moreover, scratches on said surface which are insignificant in an optical respect may disturb the sliding contact.

In a first embodiment of a scanning device in accordance with the invention a simple actuator for the auxiliary lens is realized in order to achieve that the optical-disc surface which faces the lens system is tracked accurately in operation. By means of the coils which have been provided a movement along the optical axis as well as tilting movements about axes oriented transversely to the optical axis can be realized in an efficient and simple manner. The coils are preferably segment coils, which preferably have a banana-shaped curvature, the shape being adapted to the diameter of the magnet ring. In a direction parallel to the optical axis the coils are preferably as flat as possible in order to minimize the mounting height. The magnet is preferably a magnet ring. If desired, for example is a more powerful drive is required, a further magnet ring can be used.

In a second embodiment of a scanning device in accordance with the invention the coil configuration used, where the coils each occupy one third of the circumference of the zone surrounding the auxiliary lens, provides maximal possibilities for the auxiliary lens to achieve an accurate tracking of the optical-disc surface which faces the lens system.

In a further embodiment of a scanning device in accordance with the invention segment coils are employed, as a result of which a highly efficient use is made of the magnetic driving forces generated when the coils are energized, because both long sides of each of the segment coils can be utilized for driving.

In yet a further embodiment, the measure used makes it possible to obtain a scanning unit which is compact and, particularly, flat viewed along the optical axis and, consequently, a scanning device having a small height.

Preferably, the suspension means is elastic, but is rigid in a plane transverse to the optical axis so as to prevent a displacement between the main lens, also referred to as objective lens elsewhere in this document, and the auxiliary lens in a direction transverse to the optical axis in the case of movements of the scanning unit in said direction for the purpose of tracking.

In a further embodiment, the suspension means is efficient, flat, of low mass and rigid in directions transverse to the optical axis of the lens system, which low mass in conjunction with a low mass of the second lens unit and the second drive unit guarantees a broad-band mechanical connection between the auxiliary lens and the main lens in a direction transverse to the optical axis. This is very important for a correct tracking during scanning. In order to preclude undesired tilting movements of the auxiliary lens the blade springs preferably extend in a plane containing the mass center of the second lens unit.

In a further embodiment, the radiation which is incident on the detector or detectors is radiation reflected by the record carrier, preferably by the afore-mentioned outer surface of this record carrier. The reflected radiation results from the radiation aimed at the record carrier, which originates from said radiation source of the scanning device or from an additional radiation source, depending on the construction.

Radiation-sensitive detectors are known per se and are used, for example, to correct the position of a lens in a radiation beam. Furthermore, it is known to use such detectors for determining the position and the orientation of an optical element. In the scanning device in accordance with the invention the lens system together with the detector or detectors forms said position and orientation detector system which during scanning provides information relating to the position and orientation of the second lens unit with respect to the record carrier, particularly or preferably with respect to said outer surface of this record carrier. Since the auxiliary lens forms part of the second lens unit and is rigidly connected thereto, the second detection means, which includes said detector system, supplies a signal to the second drive unit, which signal depends on the instantaneous position and orientation of the auxiliary lens with respect to the record carrier.

In a further embodiment, three lenses, also referred to as measurement lenses, permit a simple, effective and contactless detection. The regular arrangement of these lenses is advantageous for this.

It is to be noted that it is also possible to have embodiments of the scanning device in accordance with the invention which employ a combination of the measures as used in the various embodiments described.

The invention further relates to a scanning unit for focusing a scanning beam produced by a radiation source to a scanning spot on a record carrier and for imaging the scanning spot on a detection system, which scanning unit includes a lens system having an optical axis, which lens system comprises a first lens unit having a main lens and a second lens unit having an auxiliary lens, which scanning unit further includes a first electrical drive unit for moving the first lens unit in dependence upon a signal supplied by a first detection means, and a second electrical drive unit for moving the second lens unit with respect to the main lens in dependence upon a signal supplied by a second detection means and relating to the auxiliary lens, the second drive unit comprising a first part and a second part which cooperates with the first part via an air gap, the first part being secured to the first lens unit and the second part being secured to the second lens unit. Such a scanning unit is known from the afore-mentioned ISOM 1996.

It is also an object of the invention to improve the known scanning unit in such a manner that it can be used in a scanning device in order to counteract spherical aberration and/or coma and/or astigmatism.

To this end, the scanning unit in accordance with the invention is characterized in that one of the parts of the second drive unit includes a magnet disposed in a zone which surrounds the auxiliary lens and the other part includes a system of coils disposed in said zone, which system of coils comprises a number of coils which are disposed side by side viewed in the circumferential direction of the ring.

BRIEF DESCRIPTION OF THE DRAWING

The invention will now be described in more detail, by way of example, with reference to the drawing in which.

DESCRIPTION OF THE PREFERRED EMBODIMENTS

Figure 1:
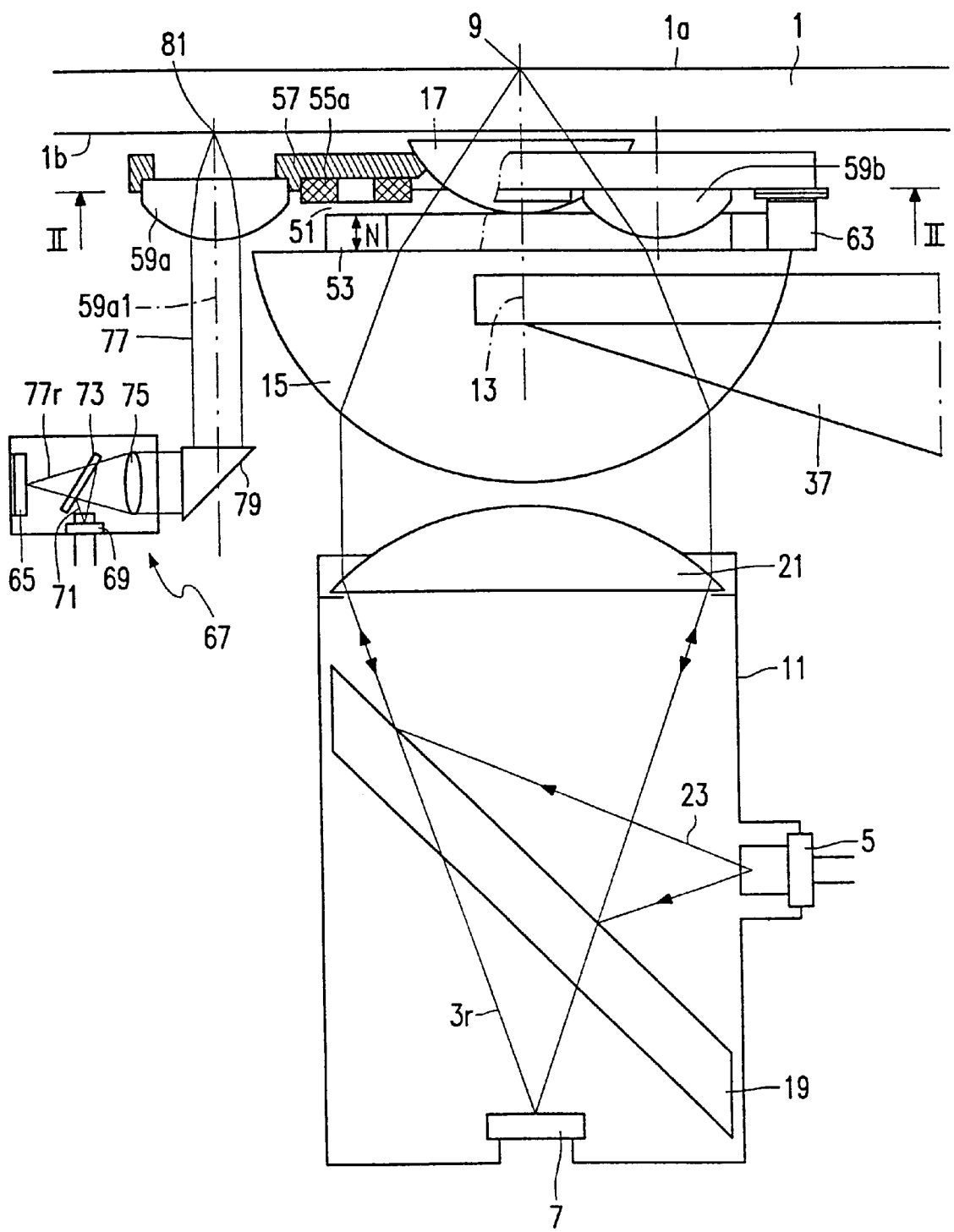
FIG. 1 shows diagrammatically a first embodiment of the optical scanning device in accordance with the invention.
Figure 2:
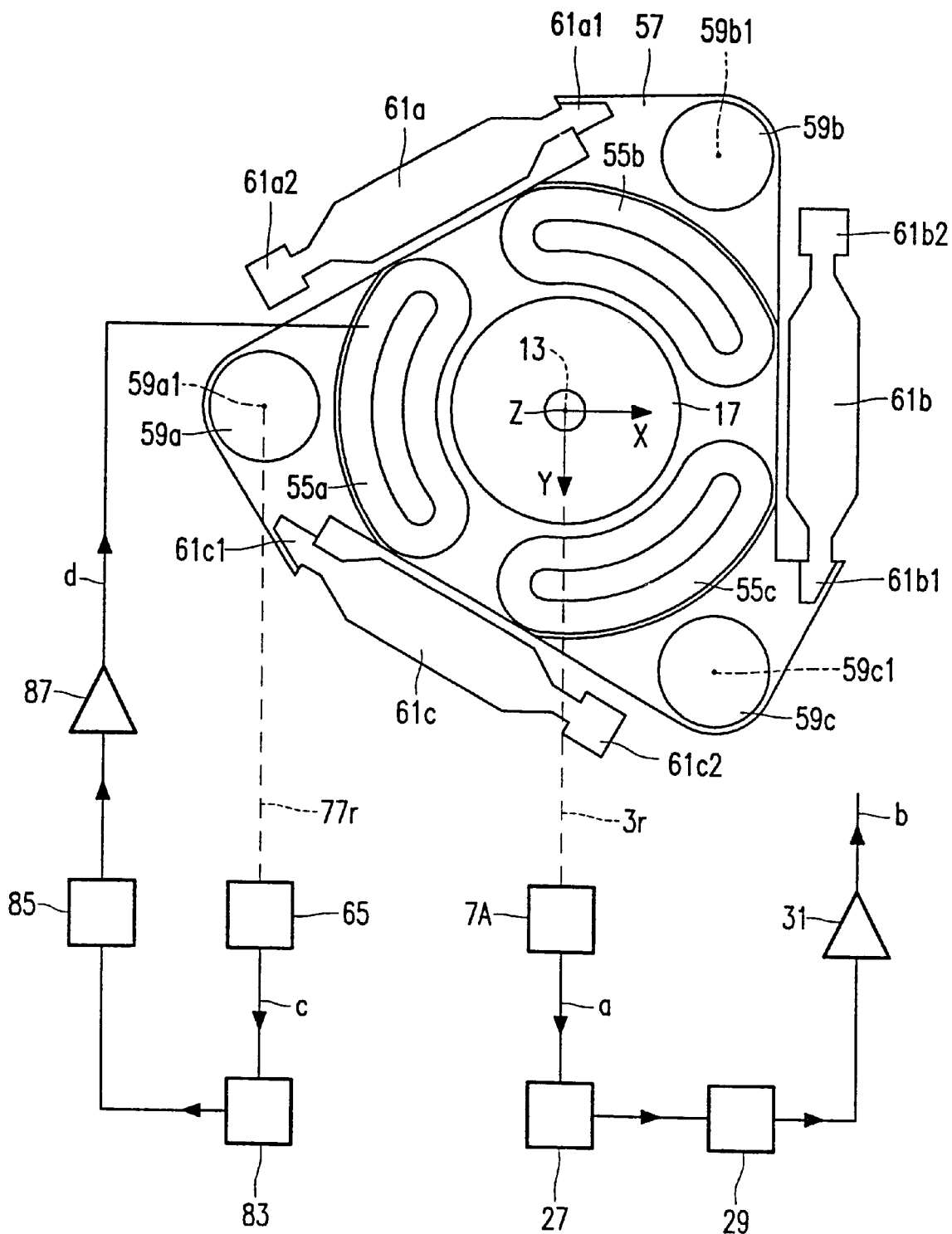
FIG. 2 is a diagammatical sectional view taken on the line II—II in FIG. 1 and showing the first embodiment provided with servo systems.
Figure 3:
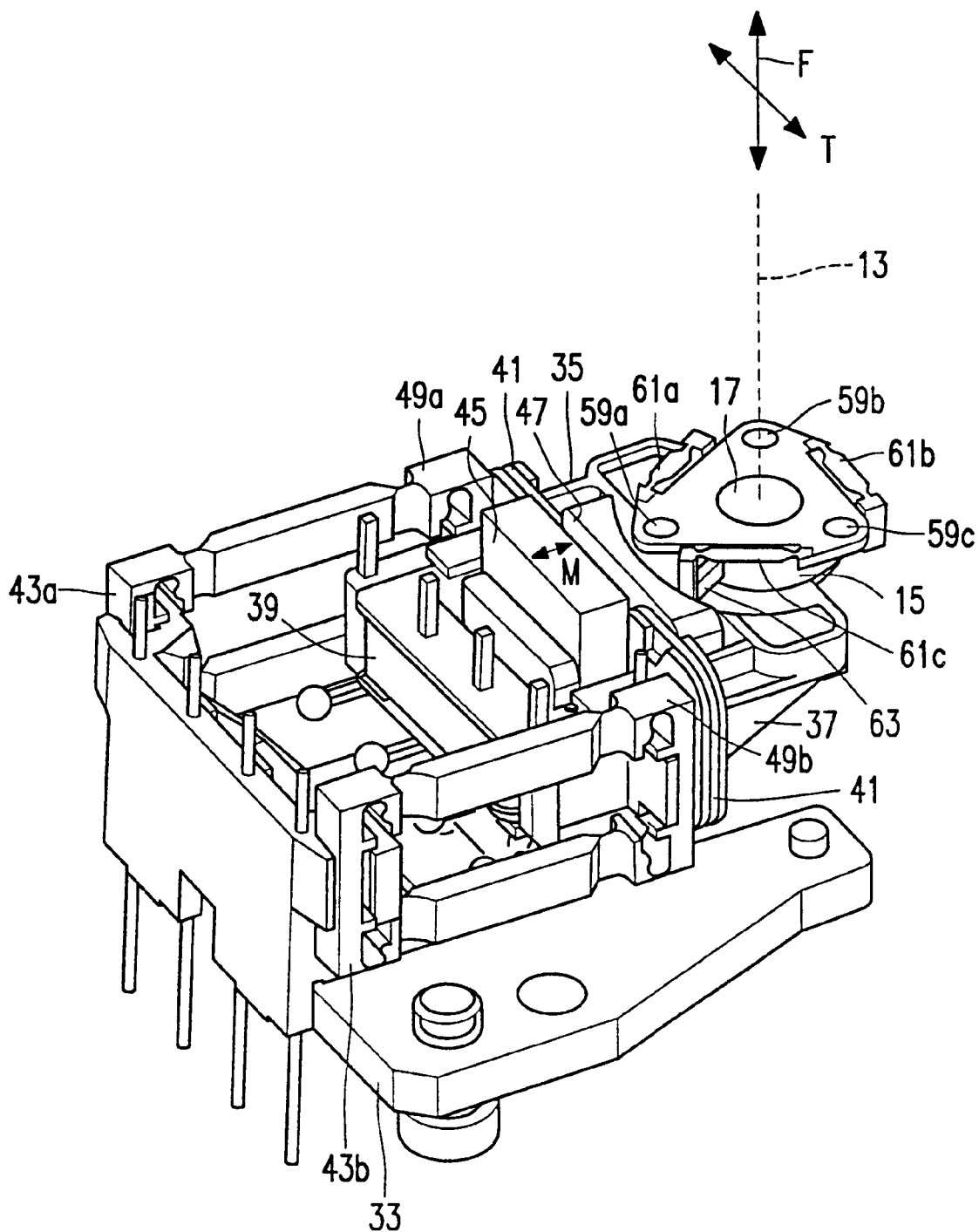
FIG. 3 is a perspective view showing an embodiment of the scanning unit in accordance with the invention, which embodiment is used in the scanning device as shown FIG. 1.

The first embodiment of the scanning device in accordance with the invention, including the scanning unit used therein, will be described in more detail with reference to FIGS. 1, 2 and 3.

The scanning device in accordance with the invention is intended for inscribing and/or reading a disc-shaped record carrier 1, particularly an optical disc in which information can be stored or has been stored in an information layer 1a as a multitude of optically readable small areas, not shown, which are arranged in a multiplicity of concentric tracks or quasi-concentric tracks together forming a spiral track, the tracks extending transversely to the plane of drawing. At one side, in the present case the upper side, the information layer 1a is covered with a protective layer, not shown, and at its other side it rests on a transparent substrate or, in more general terms, a transparent layer 1b. During scanning the record carrier 1 is supported on a rotatable turntable, not shown, the information layer la being scanned through the transparent layer 1b.

In operation the information layer 1a is scanned by a scanning beam 3 issuing from a radiation source 5 of the scanning device. The scanning device further includes a radiation-sensitive detection system 7 and an optical scanning unit for focussing the radiation beam into a scanning spot 9 on the information layer 1a of the record carrier 1, so as to image the scanning spot on the detection system 7 and so as to center the scanning spot 9 on the track to be scanned. The optical scanning unit comprises a frame 11 and a lens system which is movable with respect to this frame 11, which lens system has an optical axis 13 and comprises two lens units, i.e. a first lens unit having a main lens 15, also referred to as objective lens, and a second lens unit having an auxiliary lens 17, also referred to as SIL. The auxiliary lens 17 has a spherical surface facing the main lens 15 and, in the present case, it has a plane surface which is remote from the main lens. The frame 11 carries said radiation source 5, in the present example a laser source, and said detection system 7 and, in the present example, it comprises a transparent plane-parallel plate 19 and a collimator lens 21.

In operation said scanning beam 3 is obtained from a radiation beam 23 which is emitted by the radiation source 5 and which, after reflection from a reflecting surface of the plane-parallel plate 19, is collimated by the collimator lens 21 so as to form the scanning beam 3. The scanning beam 3 is focussed into a scanning spot 9 on the information layer 1a by the main lens 15 and the auxiliary lens 17. The information layer 1a reflects the scanning beam 3, which results in a reflected radiation beam 3r, which is converged by said lenses and which reaches the detection system 7 via the transparent plane-parallel plate 19. During reading the detection system 7 supplies a detection signal which corresponds to the signal originally recorded in the information layer 1a of the record carrier 1. In order to ensure an accurate positioning of the main lens 15 relative to the record carrier 1 the scanning device includes a servo system, to which optical error signals, particularly focus error signals and radial error signals, are applied. For this purpose, the detection system 7 includes a detection means, which is known per se and which has been referred to as the first detection means 7A elsewhere in this document. For the purpose of focussing the scanning beam 3 this detection means comprises, for example, a quadrant cell as described in the book Principles of Optical Disc Systems; G. Bouwhuis et al, 1985; ISBN 0-85274-785-3; p. 75–80; S. 2.5.2, § Astigmatic method. For information about tracking reference is made to the same book, pp. 70–73; S. 2.5.1, § Radial push-pull method.

An error signal a supplied by the first detection means 7A is applied to a signal processing unit 27, which has its output connected to the input of a control unit 29. The signal from the control unit 29 is applied to an amplifier unit 31, which supplies a signal b for controlling an electrical drive unit for moving the first lens unit.

The electrical drive unit, also referred to as first electrical drive unit elsewhere in this document, for moving the first lens unit comprises a so-called 2D actuator and is intended particularly for use in decks constructed for two-step radial tracking of optical discs. In such a deck a lens system can be translated along a radial path with respect to a disc which is rotatable about an axis of rotation. To this end, the deck comprises a turntable which is rotatably supported in a frame and a translatable device, particularly a slide which is radially movable with respect to the turntable and which carries the optical scanning device. An optical player which includes a deck comprising a turntable and a slide is known per se and is disclosed, for example, in EP-A 0464912 (PHN 13.382). The actuator in the scanning device in accordance with the invention comprises a stationary part 33 to be secured to the slide and a part 35 which is movable relative to the stationary part 33. The movable part 35 comprises a platform having a support 37 which carries the first lens unit with the main lens 15. The movable part 35 comprises a coil holder which in the present example carries a focus coil 39 and two tracking coils 41 and is movably secured to the stationary part 33 by means of a two-part suspension 43a, 43b. The stationary part 33 includes a permanent magnet 45 and ferromagnetic members, the magnet 45, which is magnetized as indicated by the arrow M, together with the ferromagnetic members forming a magnetic circuit and a magnetic air gap 47 being formed between which magnet 45 and one of the ferromagnetic members. The focus coil 39 and the tracking coil 41 extend partly into the air gap 47. The movable part 35, particularly the first lens unit carried by the support 37, being movable with respect to the stationary part 33 in a focus direction, indicated by the double arrow F, and in a tracking direction, indicated by the double arrow T. The suspension 43a, 43b comprises two frame-shaped elements 49a, 49b, which are preferably made of a plastic and have end portions which terminate in double integral hinges.

The scanning unit in accordance with the invention further includes a second electrical drive unit comprising a first part secured to the first lens unit and a second part secured to the second lens unit and cooperating with the first part via an air gap 51. In the present example the first part comprises an axially magnetized magnet ring 53, which surrounds the auxiliary lens 17 and has a direction of magnetization as indicated by the arrow N, and the second part comprises a system of segment coils 55a, 55b, 55c. Actuators comprising such coils are known per se, for example from U.S. Pat. Nos. 4.783.775 (PHD 85.099) or 4.747.668 (PHD 85.119).

In the scanning unit in accordance with the invention the segment coils 55a, 55b, 55c are equidistantly spaced along the circumference of the auxiliary lens 17 and are disposed opposite a plane pole face of the magnet ring 53. The segment coils 55a, 55b, 55c are mounted on a plate-shaped supporting element 57, which forms part of the second lens unit, which element has a central opening in which the auxiliary lens 17 is situated. In the present example the supporting element 57 carries three lenses 59a, 59b, 59b, also referred to as measurement lenses elsewhere in this document, which lenses each have an optical axis 59a1, 59a2, 59a3, which extends parallel to the optical axis 13 of the lens system. In the present example the second lens unit is connected to the first lens unit by means of three blade springs 61a, 61b, 61c. The blade springs 61a, 61b, 61c extend substantially in the plane of the supporting element 57 and are arranged with respect to one another as the sides of an imaginary equilateral triangle whose center is disposed on the optical axis 13 and whose vertices are disposed near the lenses 59a, 59b, 59c. The blade springs 61a, 61b, 61c are each secured to the supporting element 57 by their respective end portions 61a1, 61b1, 61c1, for example by means of an adhesive joint, and to the main lens by another end portion 61a2, 61b2, 61c2 via a connecting element 63. The last-mentioned connection can also be made by means of an adhesive. In the case of a suitable choice of materials, particularly as regards their optical properties and as regards their mechanical characteristics, it is possible to construct the supporting element 57, the lenses 59a, 59b, 59c and, if desired, the auxiliary lens 17 as an integrated part, which is manufactured, for example, by injection-molding.

Said measurement lenses 59a, 59b, 59c form parts of a further detection means of the scanning device in accordance with the invention, which further detection means has been referred to as second detection means elsewhere in this document. The second detection means further comprises a system of radiation-sensitive detectors. In the present example this system comprises three detectors, which in operation each cooperate with one of the measurement lenses 59a, 59b, 59c. For this purpose, the scanning device has three optical systems, which each extend optically between one of said three detectors and one of the measurement lenses 59a, 59b, 59c. The drawings show only one of the detectors, bearing the reference numeral 65, and only one of the optical systems, bearing the reference numeral 67.

The other two detectors and the other two optical systems are similar to the detector 65 and the optical system 67, respectively. The position and orientation detector system formed by the measurement lenses 59a, 59b, 59c, said detectors and the optical systems will now be described in more detail with reference to the drawings.

The record carrier 1 has a disc-shaped inherently reflecting outer surface 1b which faces the lens system during scanning. In order to minimize spherical aberration and/or coma and/or astigmatism during scanning it is important that the auxiliary lens 17 accurately follows the side facing the lens system and formed by said surface 1b. In order to achieve this, the position and orientation of the second lens unit, or rather the auxiliary lens 17, with respect to the surface 1b are constantly controlled during scanning in that one or more of the segment coils 55a, 55b, 55c is drive. The signal needed for driving the segment coils is obtained with the aid of said second detection means.

In the present example each of the optical systems comprises a radiation source unit 69, particularly a laser unit, for emitting a radiation beam 71, which is deflected via a reflecting surface, in the present example formed by a surface of a plane-parallel plate 73, and is collimated by a collimator lens 75 to form a measurement beam 77. The measurement beam 77 is guided to one of the measurement lenses 59a, 59b, 59c, in the present example the lens 59a, via a prism element 79 and by means of the relevant lens it is converged to a measurement spot 81 on or near the outer surface 1b of the record carrier 1. Reflection of the measurement beam 77 from said surface 1b results in a reflected beam 77r, which reaches the detector 65 via the measurement lens, the prism element 79, the lens 75 and the transparent plate 73. The lens 75 converges the beam to an imaging spot on a detector 65. The detector can be a radiation-sensitive measurement cell known per se. A suitable detector is for example the quadrant detector as disclosed in the book Principles of Optical Disc Systems; G. Bouwhuis et al, 1985; ISBN 0-85274-785-3; pp. 75–80; S. 2.5.2, § Astigmatic method. During scanning the radiation-sensitive detector 65 produces an output signal c, which is a function of the deviation between the position of the measurement spot 81 and the instantaneous position of the surface 1b at this location. The output signal c is applied to a signal processing unit 83, whose output is coupled to the input of a control unit 85. The control unit 85 is coupled to an amplifier unit 87, which supplies a drive signal d for one of the segment coils, in the present case the segment coil 55a. By determining a position with respect to the surface 1b of the record carrier 1 at three different locations at a comparatively short distance from the auxiliary lens 17, which position is related to the position and orientation of the auxiliary lens 17, a reliable and efficient position and orientation detector system is obtained for detecting the position and orientation of the auxiliary lens 17 during scanning. This system supplies a drive signal d to each of the segment coils 55a, 55b, 55c, thus enabling the segment coils 55a, 55b, 55c to be driven independently of one another. The second detection means therefore supplies a signal composed of the three drive signals d to the second electrical drive unit, the second lens unit being movable relative to the main lens in dependence upon this composite signal. This makes it possible to realize translations of the auxiliary lens 17 along the optical axis 13, also represented as the Z axis in the drawings, as well as tilting movements of the auxiliary lens 17 about two axes transverse to the optical axis, represented as the X axis and the Y axis of a system XYZ of orthogonal axes, and thereby assure an accurate tracking of the surface 1b by the auxiliary lens 17.

Due to the measures described hereinbefore the scanning device in accordance with the invention is particularly suitable for the use of a lens system having a large numerical aperture, for example a numerical aperture of 0.8.

Figure 4A:
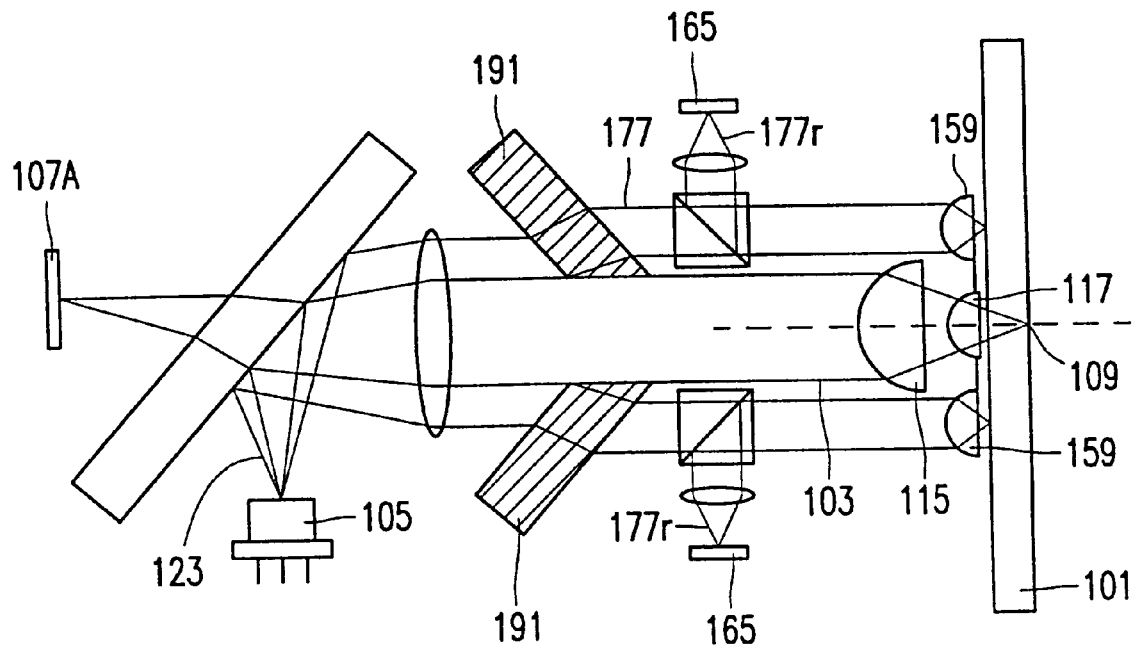
FIG. 4A shows diagrammatically a second embodiment of the scanning device in accordance with the invention.
Figure 4B:
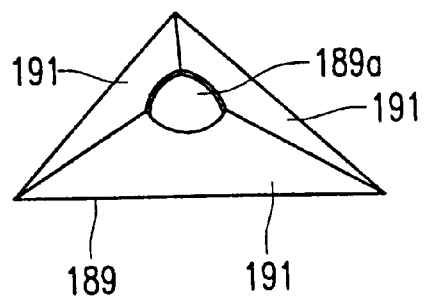
FIG. 4B is a perspective view showing a part of the second embodiment.

The scanning device in accordance with the invention shown in FIGS. 4A and 4B comprises a radiation source 105, a radiation-sensitive detection system including a first detection means 107A, and an optical scanning unit for focusing a scanning beam 103 produced by the radiation source 105 to a scanning spot 109 on a record carrier 101 and for imaging the scanning spot on the detection system. The scanning unit comprises a lens system having an optical axis 113, which system comprises a first lens unit having a main lens 115 and a second lens unit having an auxiliary lens 117. Said first detection means 107A serves for detecting the position and, if desired, the orientation of the main lens 115 with respect to the record carrier 101. The scanning unit further includes a first electrical drive unit, not shown, for moving the first lens unit in dependence upon a signal supplied by the first detection means. The scanning device further comprises a second detection unit for detecting the position and orientation of the auxiliary lens 117 during scanning. The second lens unit is driven by means of a second electrical drive unit which is controlled in dependence upon a signal supplied by the second detection means. The second detection means includes a system of lenses, which system is secured to the second lens unit and comprises measurement lenses 159 arranged in a plane oriented transversely to the optical axis 113 of the lens system. The lenses 159 each have an optical axis which extends parallel to the optical axis 113. In the present example the number of these lenses is three, the optical axes of two adjacent lenses 159 being spaced at a distance of substantially 120 degrees of arc from one another. The second detection means further comprises radiation-sensitive detectors 165 for supplying signals which are dependent on the radiation reflected from the record carrier 101 and incident on the detectors via the measurement lenses. The number of detectors 165 corresponds to the number of measurement lenses 159. The radiation which is incident on the detectors 165 during scanning originates from measurement beams 177r reflected from the record carrier 101, preferably its surface 101B which faces the lens system. The source of these measurement beams is the radiation source 105, which emits a radiation beam 120, which partly changes into the scanning beam 103 and which is partly split into three measurement beams 177 by an optical element 189 comprising three plane-parallel plates 191. The optical element 189 has a central aperture 189a for the passage of the scanning beam 103. In comparison with the first embodiment this scanning device has the advantage that only one radiation source is required. For the remainder the scanning device can be as shown in FIGS. 1, 2 and 3 and for this reason the present scanning device will not be described in any further detail.

It is to be noted that the invention is not limited to the embodiments disclosed herein. Particularly variants of the constructions of the detectors and/or coils and/or suspension means and different numbers of detectors and/or measurement lenses and/or coils fall within the scope of the invention. Moreover, the electrical drive units shown herein can be constructed in other manners.

What is claimed is:

1. An optical scanning device for scanning an information track of an optically readable record carrier, which scanning device includes a radiation source, a radiation-sensitive detection system, and an optical scanning unit for focusing a scanning beam produced by the radiation source to a scanning spot on the record carrier and for imaging the scanning spot on the detection system, the scanning unit including a lens system having an optical axis, which lens system comprises a first lens unit having a main lens and a second lens unit having an auxiliary lens, which scanning device further includes a first detection means involved in detection of the main lens with respect to the record carrier, and a second detection means involved in detection of the auxiliary lens, the scanning unit further including a first electrical drive unit for moving the first lens unit in dependence upon a signal supplied by the first detection means, and a second electrical drive unit for moving the second lens unit with respect to the main lens in dependence upon a signal supplied by the second detection means, the second drive unit comprising a first part and a second part which cooperates with the first part via an air gap, the first part being secured to the first lens unit and the second part being secured to the second lens unit, characterized in that the second detection means includes a position and orientation detector system for detecting a position and orientation of the auxiliary lens with respect to the record carrier during scanning.

2. An optical scanning device as claimed in claim 1, characterized in that one of the parts of the second drive unit includes a magnet disposed in a zone which surrounds the auxiliary lens and the other part includes a system of coils disposed in said zone, which system of coils comprises a number of coils which are disposed side by side viewed in the circumferential direction of the magnet.

3. An optical scanning device as claimed in claim 2, characterized in that the number of coils is three, the coils being segment coils, which are arranged equidistantly in a circular zone around the auxiliary lens.

4. An optical scanning device as claimed in claim 2, characterized in that the magnet is a magnet ring, which is axially magnetized, the system of coils being disposed opposite the ring magnet.

5. An optical scanning device as claimed in claim 1, characterized in that the second lens unit is secured to the first lens unit with the aid of a suspension means which allows movements in a direction parallel to the optical axis of the lens system and in directions transverse to the optical axis.

6. An optical scanning device as claimed in claim 5, characterized in that the suspension means is elastic, but is rigid in directions transverse to the optical axis.

7. An optical scanning device as claimed in claim 5, characterized in that the suspension means comprises three blade springs which extend substantially in a plane transverse to the optical axis, which blade springs are arranged equidistantly in a zone which surrounds the auxiliary lens and are each secured to the first lens unit at a first end portion and to the second lens unit at a second end portion.

8. An optical scanning device as claimed in claim 1, characterized in that the second detection means includes a lens system secured to the second lens unit, which lens system extends in a plane oriented transversely to the optical axis of the lens system, which detection means further includes at least one radiation-sensitive detector for supplying a signal which is dependent upon the radiation which is incident on the detector or detectors via the lens system.

9. An optical scanning device as claimed in claim 8, characterized in that the lens system comprises three lenses arranged around the auxiliary lens, the optical axes of two adjacent lenses being spaced at a distance of substantially 120 degrees of arc from one another and the number of detectors being three.

10. An optical scanning unit for focusing a scanning beam produced by a radiation source to a scanning spot on a record carrier and for imaging the scanning spot on a detection system, which scanning unit includes a lens system having an optical axis, which lens system comprises a first lens unit having a main lens and a second lens unit having an auxiliary lens, which scanning unit further includes a first electrical drive unit for moving the first lens unit in dependence upon a signal supplied by a first detection means, and a second electrical drive unit for moving the second lens unit with respect to the main lens in dependence upon a signal supplied by a second detection means and relating to the auxiliary lens, the second drive unit comprising a first part and a second part which cooperates with the first part via an air gap, the first part being secured to the first lens unit and the second part being secured to the second lens unit, characterized in that one of the parts of the second drive unit includes a magnet disposed in a zone which surrounds the auxiliary lens and the other part includes a system of coils disposed in said zone, which system of coils comprises a number of coils which are disposed side by side viewed in the circumferential direction of the magnet.

11. An optical scanning unit as claimed in claim 10, characterized in that the number of coils is three, the coils being segment coils, which are arranged equidistantly in a circular zone around the auxiliary lens.

12. An optical scanning unit as claimed in claim 11, characterized in that the magnet is an axially magnetized ring magnet, the system of coils being disposed opposite the ring magnet.

13. An optical scanning unit as claimed in claim 10, characterized in that the second lens unit is secured to the first lens unit with the aid of a suspension means which allows movements in a direction parallel to the optical axis of the lens system and in directions transverse to the optical axis.

14. An optical scanning unit as claimed in claim 13, characterized in that the suspension means is rigid in directions transverse to the optical axis.

15. An optical scanning unit as claimed in claim 13, characterized in that the suspension means comprises three blade springs which extend substantially in a plane transverse to the optical axis, which blade springs are arranged equidistantly in a zone which surrounds the auxiliary lens and are each secured to the first lens unit at a first end portion and to the second lens unit at a second end portion.

16. An optical scanning unit as claimed in claim 10, characterized in that a lens system is secured to the second lens unit, which lens system comprises measurement lenses arranged around the auxiliary lens in a plane which is oriented transversely to the optical axis of the lens system.

17. An optical scanning unit as claimed in claim 16, characterized in that the lens system comprises three lenses arranged around the auxiliary lens, the optical axes of two adjacent lenses being spaced at a distance of substantially 120 degrees of arc from one another and the number of detectors being three.

18. An optical player comprising a turntable for supporting an optically scannable record carrier and further comprising a positioning device which includes an optical scanning device as claimed in claim 1, which positioning device moves the scanning device in a substantially radial direction with respect to the turntable during scanning.

* * * * *